Patented Nov. 28, 1922.

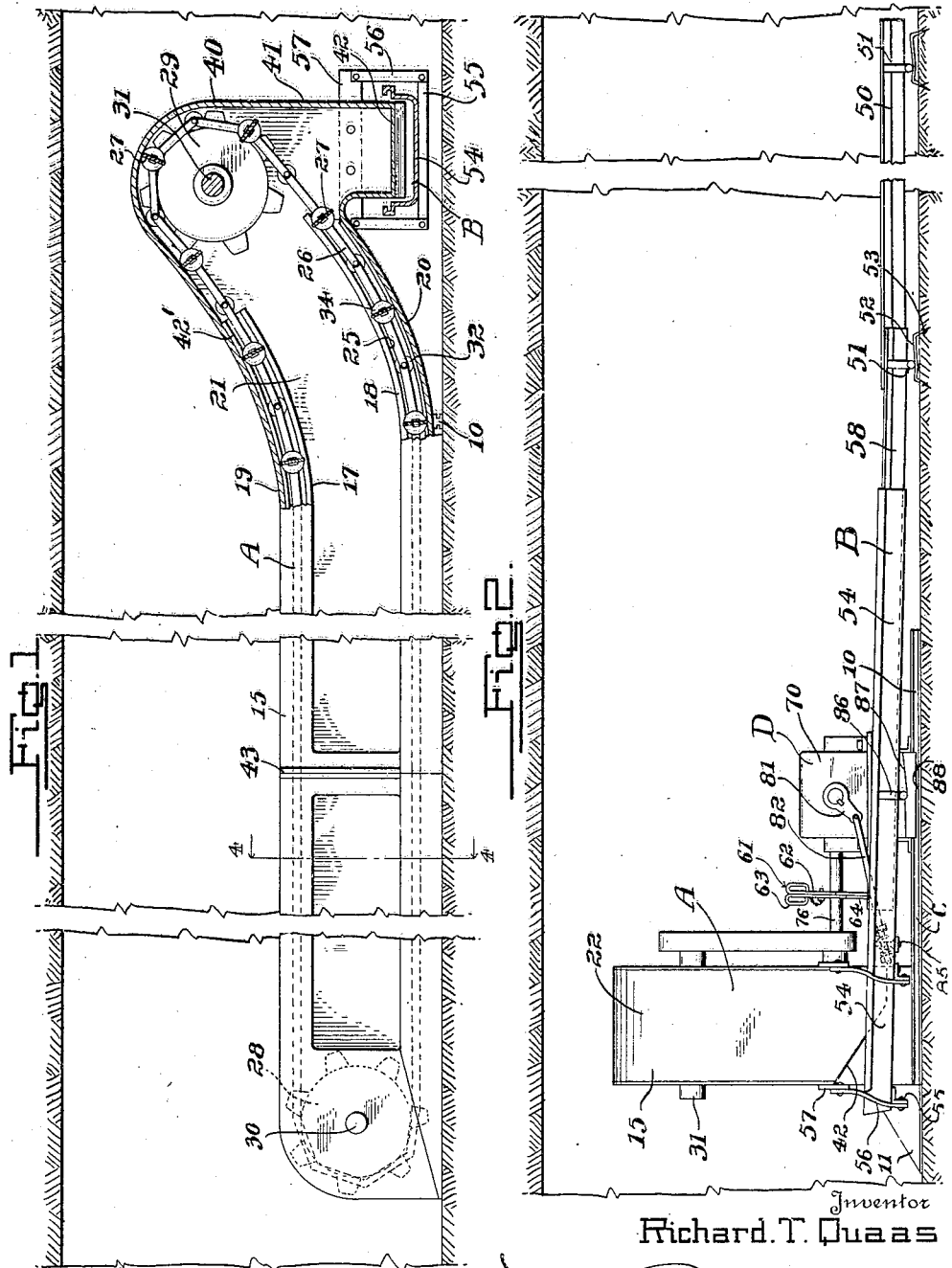
R. T. QUAAS.
MATERIAL HANDLING MACHINE.
APPLICATION FILED DEC. 15, 1921.
1,436,907.
Patented Nov. 28, 1922.
2 SHEETS—SHEET 1.
Inventor
Richard T. Quaas
By Lamaster and Allwine
Attorneys

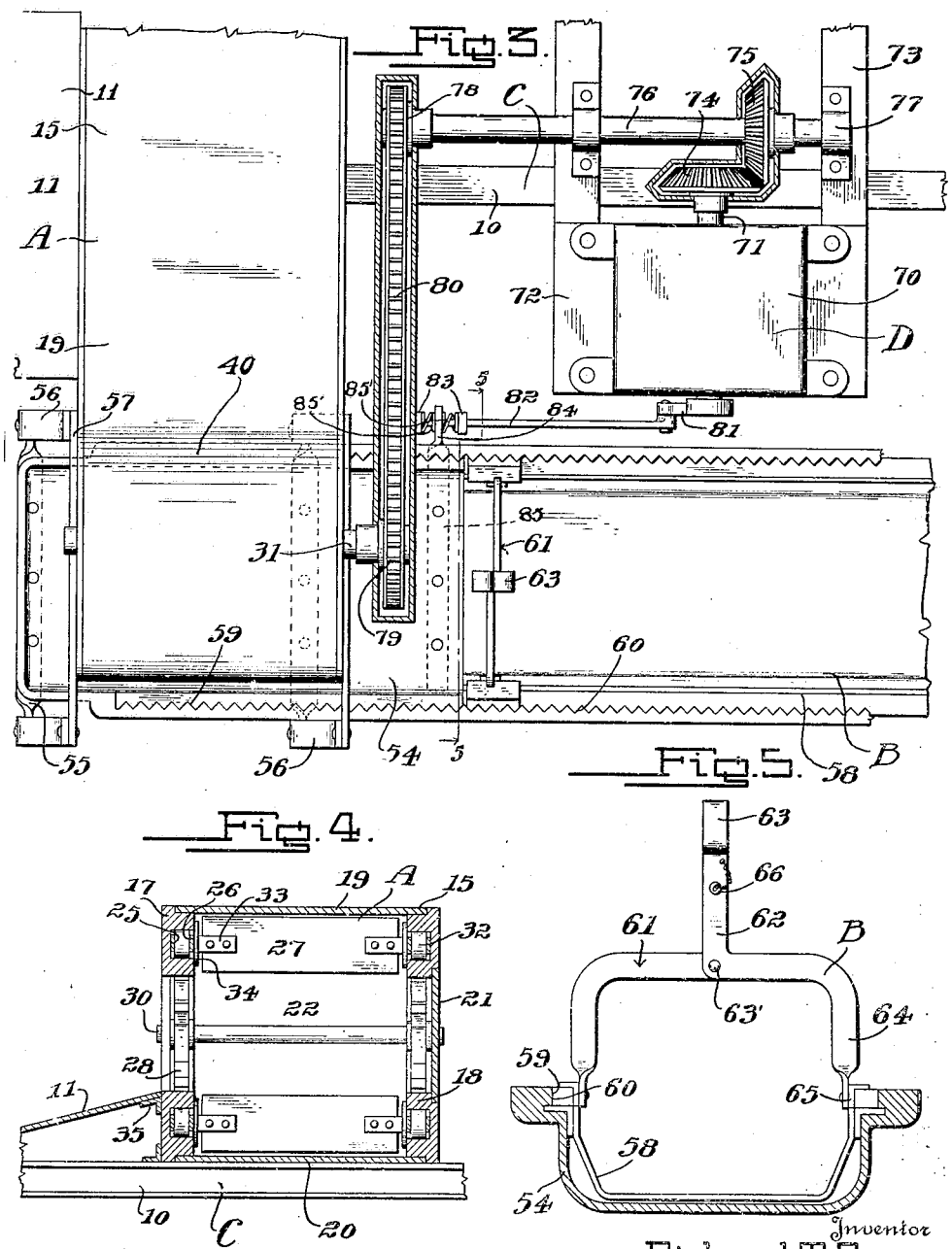

1,436,907

UNITED STATES PATENT OFFICE.

RICHARD THEODORE QUAAS, OF NEW YORK, N. Y.

MATERIAL-HANDLING MACHINE.

Original application filed March 30, 1920, Serial No. 369,921. Divided and this applicaton filed December 15, 1921. Serial No. 522,586.

*To all whom it may concern:*

Be it known that I, RICHARD T. QUAAS, a citizen of the United States, residing at New York, in the county of New York and State of New York, have invented certain new and useful Improvements in Material-Handling Machines, of which the following is a specification.

This invention relates to loading and conveying machines and is a division of my pending application, filed March 30, 1920, Serial #369,921, for coal mining machines and the primary object of the present invention is the provision of a novel conveying means for receiving coal directly from the face or fall of a coal seam in a room or stall as the same is cut and for automatically delivering the same to the pit cars at the entries or headings.

Another object of the invention is the provision of a novel loading or conveying machine which is susceptible for general application, such as the handling of sand, grain, coal, gravel or similar material, and which embodies a lateral extending conveyor for receiving the material and which can extend parallel therewith, and a relatively long longitudinally extending conveyor for receiving the material from one end of the lateral conveyor and for delivering the same to a distant point or directly to wagons, cars or the like.

A further object of the invention is the provision of a novel loading and conveying device embodying a relatively long laterally extending conveyor having means for permitting the material to be placed thereon at any point throughout its length, and a longitudinally extending conveyor disposed at one end of the laterally extending conveyor for receiving the material and for delivering the same to a distant point.

A still further object of the invention is the provision of an improved means for simultaneously operating the laterally extending conveyor and the longitudinally extending conveyor, the longitudinally extending conveyor including means for permitting the shaking thereof in order to feed the material toward one end.

A still further object of the invention is to provide in a conveyor of the above character, a novel longitudinally extending conveyor which can be made extensible, so that as the transverse or lateral conveyor is moved forward from the point to which the material is to be delivered, the longitudinally extending conveyor can be extended to conform to the distance through which the transverse or lateral conveyor has been moved.

A still further object of the invention is the provision of a novel conveying and loading machine embodying a lateral and longitudinally extending conveyor, the longitudinally extending conveyor consisting of inclined troughs, means for shaking or oscillating the troughs, means for permitting the troughs to be extended in relation to each other, and means for holding the troughs in their adjusted position against movement during the shaking or oscillating of the conveyor.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a front elevation, partly in section, of the improved conveying and loading machine.

Figure 2 is a side elevation of the same, illustrating the longitudinally extending conveyor for receiving the material from the laterally extending conveyor and for delivering the same to a distant point.

Figure 3 is a fragmentary top plan view of the improved loading and conveying machine showing parts thereof in section and illustrating the novel means for synchronously operating the laterally and longitudinally extending conveyors.

Figure 4 is a detail transverse section through the laterally extending conveyor taken on the line 4—4 of Figure 1, and Figure 5 is a detail transverse section through the longitudinally extending conveyor taken on the line 5—5 of Figure 3.

Referring to the drawings in detail, wherein similar reference characters designate corresponding parts throughout the several views, the letter A indicates the laterally extending conveyor for receiving the material; B, the longitudinally extending conveyor for receiving the material from the laterally extending conveyor and for delivering the material to wagons or cars or to some distant point; C, the under frame or carriage for supporting the laterally extending conveyor and other parts of the improved machine; and D, the operating means for the laterally conveyor A and the longitudinally extending conveyor B.

The lateral conveyor A is disposed directly upon the frame C adjacent to the forward end thereof and this frame merely consists of longitudinally extending runners or ground engaging beams 10. The beams 10 can be connected in any preferred suitable manner, such as by transversely extending connecting beams 73. The lower supporting frame C is adapted to be shifted forwardly for moving the conveyor A forwardly as the coal is cut from the face of the seam by the same means as disclosed in the parent application. The forward ends of the beams 10 may extend slightly beyond the front face of the conveyor A for the reception of the laterally extending inclined platform 11, which serves as means for guiding the material being handled on to the conveyor, as will be hereinafter more fully apparent as the description proceeds.

The laterally extending conveyor A includes a casing 15, which is secured directly to the upper surface of the runner bars 10. The casing 15 includes upper and lower pairs of spaced beams 17 and 18 which support the upper wall 19, the bottom wall 20, the rear wall 21 and the end wall 22. The front portion of the casing 20 is left open throughout its entire length as clearly shown in Figure 1 of the drawings, so that the coal or other material being handled will be permitted to freely enter the housing or casing 20. The inner faces of the upper and lower pairs of beams 17 and 18 are provided with guide grooves 25 in which are slidably mounted the sprocket chains 26. These sprocket chains 26 have secured thereto at spaced points the transversely extending flights or scraper blades 27 and these sprocket chains 26 are trained around pairs of sprocket wheels 28 and 29 disposed at the opposite ends of the casing. The pair of sprocket wheels 28 can be keyed to a rotatable shaft 30 carried by one end of the casing or housing 20 while the pair of sprocket wheels 29 can be keyed to a transversely extending shaft 31 carried by the opposite end of the housing. It is to be noted that the shaft 31 is located in a plane above the shaft 30, the purpose of which will be hereinafter more fully described. If desirable, the sprocket chains 26 may have interposed therein at suitable points anti-friction rollers 32 for facilitating the travel of the chains in the guide grooves 25. The stems 33 which are utilized for connecting the flights or scraper blades 27 with the chains 26 may have secured thereto face plates 34 for engaging the outer surface of the beams 17 and 18 in order to insure against lateral shifting of the frames in the guide grooves 25. The above mentioned features are merely matters of details and can be eliminated if so desired.

It is to be noted that the lower run of the conveyor frames 26 is so disposed that the flights 27 carried thereby will be in relatively close engagement with the bottom wall 20 so that when coal or other material being handled is brought into the housing or casing 15, the flights or blades 27 will engage the same and move the material toward one end of the housing.

The inclined platform 11 is secured to the front face of the forward beam of the lower pair of beams 18 by a suitable angle iron or the like 35, and the upper edge thereof communicates directly with the open face of the housing or casing 15. The forward edge of the platform 11 may be secured to the forward terminals of the runner bars 10.

One end of the housing or casing 15 of the laterally extending conveyor A is inclined upwardly as at 40 and terminates in a hopper 41, below which is positioned the forward end of the longitudinally extending conveyor B. The hopper 41 can be provided with a rearwardly inclined lower wall 42 for guiding the material to the lower open end of the hopper. The upper and lower pairs of beams 17 and 18 have their terminals which extend into the inclined end 40 of the housing or casing 15 inclined upwardly as at 42' in order to form effective means for guiding the chain conveyor during its travel and for holding the blades or flights 27 carried by the lower run of the conveyor chain in close proximity with the inclined portion of the lower wall 20.

If desirable, the laterally extending conveyor A and the inclined platform 11 can be made in sections and joined together as shown at 43. This facilitates the transportation of the machine and the positioning of the same in a room or stall of a mine. If the machine is used for simply digging entries or headings it may be made in one section if so desired.

The longitudinally extending conveyor B, as stated, has its forward end disposed directly below the hopper 41 carried by one end of the casing or housing 15. The longitudinally extending conveyor B consists of a plurality of troughs 50 which are preferably formed of sheet metal or the like of substantially U-shaped form in cross section. Owing to the resiliency of the sheet metal, the sides of the troughs may be readily compressed so that the same may be placed one within the other. In joining the troughs 50 together, the same may be bolted or secured together in any manner that may be desired, and the troughs carry depending rocker arms 51, which are rockably supported by the concaved upper surface 52 of supporting members or cross ties 53. Now, it can be seen that other trough sections can be added to the conveyor as the laterally extending conveyor is moved forwardly. A trough section 54 is permanently carried by the outer end of the housing or casing 15 of the laterally extending conveyor A. The forward end of the permanently carried trough 54 carries a pair of spaced parallel angle irons 55 and the terminals of these angle irons has secured thereto the upwardly extending flexible supporting arms 56. The arms 56 have their upper ends attached to braces 57 secured to the sides of the housing 15 of the laterally extending conveyor A. This trough section 54 is adapted to be oscillated back or forth so that the coal or other material falling thereon from the hopper 41 will be slid down the longitudinally extending conveyor to the pit cars or other means employed for receiving the material. It is to be noted that the section 54 is inclined slightly downwardly from its forward end toward its rear end, and if desirable all of the trough sections may have a slight downwardly incline in order to facilitate the travel of the material being handled down the same. After each cut is made in the face of the coal seam or it is desired to move the lateral extending conveyor A forwardly, for any purpose, the supporting frame or runner bars C are pushed forwardly by the means shown and described in the parent application, heretobefore mentioned. When the machine is moved bodily over the ground, it is necessary of course, to lengthen the longitudinally extending conveyor B. This is accomplished by providing a telescoping section 58, which is adapted to fit in the permanently carried section 54. In placing the telescoping section 58 in the permanently carried section 54, the sides thereof are flexed inwardly. The inner faces of the permanently carried section 54 adjacent to the upper edges thereof are provided with a plurality of spaced teeth 59, which extend substantially the entire length of the section. The telescoping section 58 has formed on its outer side edges adjacent to the inner end thereof the teeth 60 which are adapted to mesh or engage the teeth 59. To firmly hold the teeth 60 in engagement with the teeth 59 a clamp structure 61 is provided. This clamp structure 61 includes a pair of handles 62 which are pivotally connected together as at 63'. The upper ends of the handles 62 are provided with hand grips 63, while the lower ends of the handles 62 are provided with depending legs 64, the lower terminals of which carry feet or jaws 65. By operating the handles 62 the feet or jaws 65 may be brought into or out of engagement with the sides of the telescoping section 50. When the handles 62 are in direct alignment with each other, the feet or jaws 65 are spread so as to force the teeth 60 into engagement with the teeth 59 and the same are held in this position by means of a removable pin 66 which is adapted to engage in aligned openings formed in the arms 62. Now, if desirable, the feet or jaws 65 may be permanently connected to the sides of the telescoping trough section 58, so that it is merely necessary to move the handles 62 in order to bring the sides of the telescopic section 58 into and out of engagement with the permanently carried section 54.

The operating means D for the laterally extending conveyor A and the longitudinally extending conveyor B includes a single motor 70, which may be of any desired type. The armature shaft 71 thereof extends forwardly from both sides thereof. The motor 70 is bolted or otherwise secured to a suitable bed plate 72, which can be in turn bolted or otherwise secured to longitudinally extending beams 73. One end of the armature shaft 71 has keyed or otherwise secured thereto a bevelled gear 74, which meshes with a bevelled gear 75 which is keyed or otherwise secured to a counter shaft 76 which is rotatably mounted in suitable bearings 77 carried by the beams 73. The inner end of the counter shaft 76 has keyed or otherwise secured thereto a sprocket wheel 78, which is in direct alignment with a sprocket wheel 79 keyed to shaft 31 which extends transversely of the housing 15 of the laterally extending conveyor A as heretofore stated. The sprocket wheels 78 and 79 have trained around the same the sprocket chain 80. Thus, it can can be seen that when the motor 70 is in operation, the counter shaft 76 will be operated therewith as will be the shaft 31 consequently moving the conveyor chains 26 through the housing or casing 15. The opposite end of the armature shaft 71 has keyed or otherwise secured thereto a crank arm 81, which in turn carries the pitman 82. The forward end of the pitman rod 82 has secured thereto a pair of spaced nuts 83 between which is positioned an ear 84 carried by a transversely extending bar 85 bolted or otherwise secured to the permanently carried section 54. Between the nuts 83 and the ear 84 are disposed springs 85', which are coiled around the rod 82. Thus it can be seen that when the motor 70 is in operation, the permanently carried section 54 will oscillate back and forth, which in turn will transmit its motion to the other sections 50 of the conveyor. Thus, the laterally extending conveyor A and the longitudinally extending conveyor B are operated simultaneously. Owing to the spring connection 85' of the pitman rod 82 with the bar 85, all sudden jars and strain are taken off the pitman rod and the permanently carried section 54. It can be seen that rocking movement of the sections 50, is permitted, owing to the rocker arms 51 carried thereby. In order to give further support for the permanently carried section 54, the same can also be provided intermediate its ends with a rocker arm 86 which can be mounted upon the concaved upper surface 87 of a block 88, which can be secured to the runner bars 10 or the frame C in any preferred manner.

All of the moving portions of the machine, such as gear wheels, sprocket wheels and chains are adapted to be housed in suitable housings or casings as clearly shown in Figures 2 and 3 of the drawings. It is to be understood that any particular type of casing or housing may be used which is desirable or practical according to the character of the moving parts to be housed.

In operation of the improved conveyor and loading machine, the coal or other material being handled is forced up the inclined platform 11 in any preferred manner, from whence it falls into the casing 15. The flights 27 carried by the lower runs of the chains 26 will engage the material and carry the same through the casing 15 up the inclined end thereof and force the same into the hopper 41. The material will drop through the hopper onto the permanently inclined carried section 54 which is oscillated back and forth by the pitman rod 82. This agitates the material in the trough and keeps the same in motion so that the material will slide down the trough on to wagons or receptacles which may be used for dumping the material. It is obvious that as the lateral conveyor is moved forwardly, that the permanent section 54 and the telescoping section 58 can be pulled out in accordance with the distance the lateral conveyor is moved forwardly. When the lateral conveyor A is positioned such a distance from the point where the material is being delivered that adjustment of the telescoping section 58 will not permit the end of the trough or longitudinal section to reach the desired point of delivery, it is merely necessary to add another trough section 50 onto the conveyor.

From the foregoing description, it can be seen that a simple and effective means has been provided for handling all kinds of coarse material and which will permit the material to be loaded into the machine along a relatively wide front and allow the material to be delivered to any point distant from the machine.

Changes in details may be made without departing from the spirit or scope of this invention; but,

I claim:

1. In a conveying and loading machine, a frame, a transversely extending conveyor carried by the frame, a plurality of troughs arranged longitudinally of the frame, means for operating the transversely extending conveyor and means for oscillating the troughs.

2. In a conveying machine, a frame, a housing arranged transversely of the frame, a movable conveyor belt arranged in the housing, means for permitting the material being handled to be brought into the housing in the path of said conveyor belt, a longitudinally extending conveyor arranged at one end of the transverse conveyor, and means for operating said conveyors.

3. In a material handling machine, a frame, a housing arranged transversely of the frame, a movable conveyor belt arranged in the housing, a longitudinally extending conveyor arranged at one end of the transverse conveyor and comprising a plurality of U-shaped through members, means hingedly connecting one of the trough members to the frame and means for oscillating said trough member.

4. In a material handling machine, a frame, a housing arranged transversely of the frame, a movable conveyor belt arranged in the housing, an inclined platform for guiding the material being handled into the housing, and a longitudinally extending conveyor disposed at one end of the transverse conveyor for receiving the material being handled therefrom.

5. In a material handling device, a frame, a transversely extending conveyor carried by the frame, a longitudinally extending conveyor disposed at one end of the transverse conveyor and arranged to receive the material being handled therefrom and comprising a plurality of U-shaped trough members, means hingedly connecting one of the trough members with the frame, means connecting all of the trough members together, and means for oscillating the hinged trough member.

6. In a material handling machine, a shiftable frame, a transversely extending conveyor carried by the frame, a longitudinally extending conveyor arranged at one end of the transverse conveyor and means for increasing the length of the longitudinally extending conveyor when the frame is shifted.

7. In a material handling machine, a movable frame, a transversely extending endless conveyor belt carried by the frame, a longitudinally extending conveyor arranged at one end of the conveyor belt for receiving material therefrom and including a plurality of U-shaped troughs, means for oscillating the troughs, and means for increasing the lengths of the troughs when the frame is moved.

8. In a material handling machine, a frame, a conveyor arranged transversely of the frame, a trough arranged on one end of the conveyor, means hingedly connecting the trough with the frame, means for oscillating the trough, a telescopic trough section carried by the first mentioned trough and means for locking the telescoping section in engagement with the first mentioned trough.

9. In a material handling machine, a frame, a conveyor arranged transversely of the frame, an extensible trough disposed at one end of the conveyor for receiving material being handled therefrom, and means for actuating the transverse conveyor and the trough.

10. In a material handling machine, a frame, a transversely extending conveyor carried by the frame, a trough arranged at one end of the conveyor, resilient arms connecting the trough with the frame, a motor, means operatively connecting the transverse conveyor with the motor, a crank arm carried by the motor, and a pitman rod operatively connecting the crank arm with the trough.

11. In a material handling machine, a frame, an oscillating trough carried by the frame, a plurality of inwardly extending teeth formed on the side edges of the trough, a telescoping section, teeth carried by the telescoping section, and a movable clamp arranged to force the teeth carried by the telescoping section into engagement with the teeth carried by the trough.

12. In a material handling machine, a frame, a transversely extending housing carried by the frame having its entire front face open for reception of material, an endless conveyor belt mounted in said housing for moving material through said housing, a hopper formed on one end of the housing, and a second longitudinally extending conveyor arranged to receive the material from the hopper.

13. In a material handling machine, a frame, a transversely extending housing carried by the frame having its entire front face open for the reception of material and including a top, bottom, and side walls, an endless chain conveyor mounted in the housing including a plurality of transversely extending flights, the flights carried by the lower one of the chain conveyor being disposed relatively near the bottom wall of the housing, and a longitudinally extending conveyor arranged to receive the material from the first mentioned conveyor.

14. In a material handling device, a transversely extending housing having its front face open for reception of material, an inclined platform for guiding the material into said housing, an endless conveyor belt mounted in said housing for moving material therethrough, one end of said housing having an inclined portion formed thereon, a hopper carried by said inclined portion, and a longitudinally extending conveyor arranged directly below said hopper.

RICHARD THEODORE QUAAS.